United States Patent
Voelz

[15] 3,663,811
[45] May 16, 1972

[54] METHOD FOR DETERMINING A RESTRICTIVE AIR FILTER

[72] Inventor: Frederick L. Voelz, 16133 118th Avenue, Orland Park, Ill. 60462

[22] Filed: Oct. 21, 1970

[21] Appl. No.: 82,864

[52] U.S. Cl.............................250/43.5 R, 73/116, 73/119 A
[51] Int. Cl. ...........................................................G01m 15/00
[58] Field of Search.....................250/43.5 R; 73/119 A, 116

[56] References Cited

UNITED STATES PATENTS 3,406,562  10/1968  Perna........................................73/116
3,320,801  5/1967   Pehindress..............................73/116

Primary Examiner—Archie R. Borchelt
Assistant Examiner—C. E. Church
Attorney—Robert J. Mawhinney and Thomas J. Clough

[57] ABSTRACT

A method for determining whether a carburetor air filter element unduly restricts the flow of combustion air to an internal combustion engine is disclosed. This method comprises analyzing exhaust gases from an internal combustion engine operated at no load conditions on the main carburetion circuit both with and without the air filter element being tested in the air intake system. If the carbon monoxide concentration of the exhaust gases obtained without the element in the system is substantially reduced in comparison with the carbon monoxide concentration of the exhaust gases obtained with the element in the system, the air filter element unduly restricts the flow of air to the engine.

8 Claims, 1 Drawing Figure

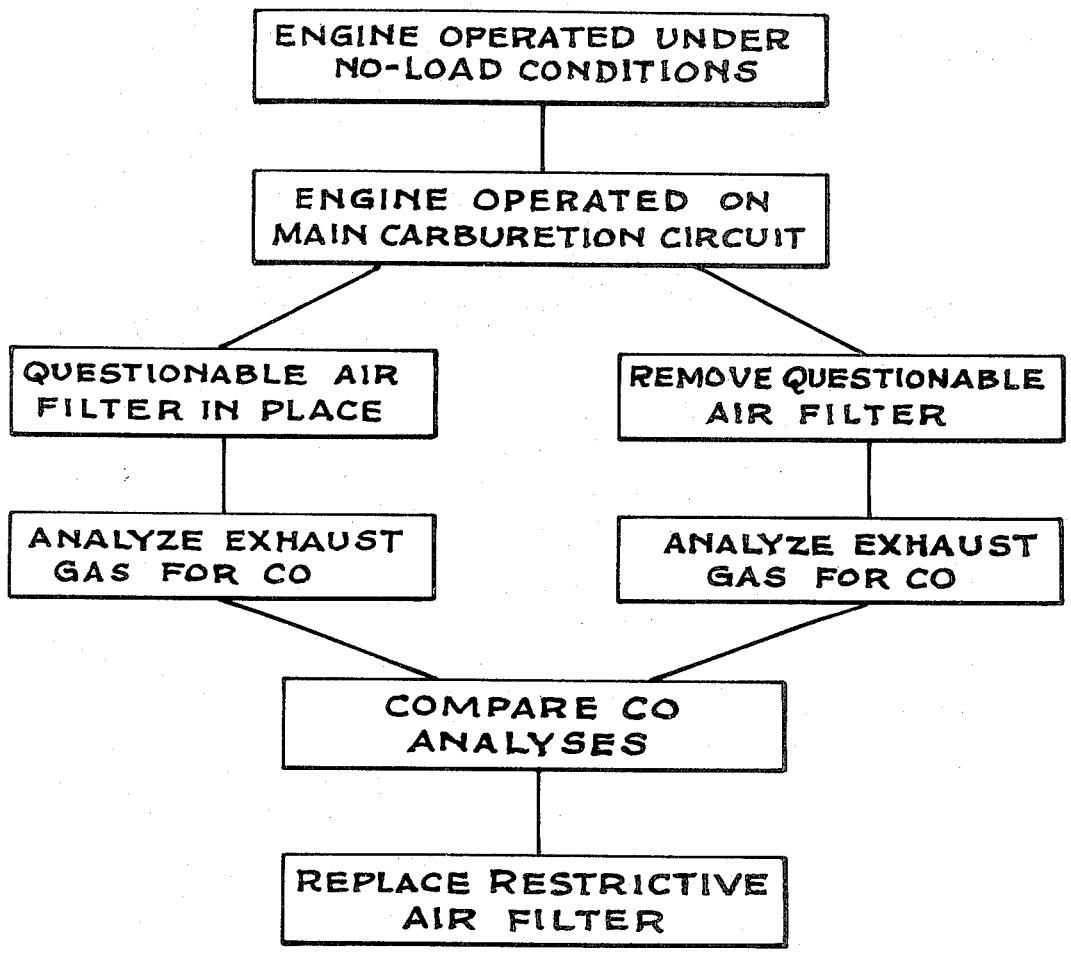

METHOD FOR DETERMINING A RESTRICTIVE AIR FILTER

The present invention relates to maximizing the operating efficiency of the internal combustion engine. In particular, this invention relates to a method for determining whether the carburetor air filter element of the internal combustion engine unduly restricts the flow of needed combustion oxygen to said engine.

The internal combustion engine is used to power, among other things, practically all of the transportation vehicles in use today. For example, this type of power system is used in over 90 million automobiles in the United States alone. With the automobile population continually increasing, the problem of maintaining each of the autos at maximum operating efficiency is becoming more and more difficult. This problem is accentuated by the limited supply of trained mechanics and technicians. Many of the current maintenance procedures are expensive, cumbersome and time-consuming. This further limits the number of vehicles that can be properly maintained, as well as inconveniencing the auto owner to the point where he may actually avoid needed engine maintenance. Therefore, it would be advantageous to develope inexpensive, uncomplicated and quick maintenance methods for internal combustion engines.

The internal combustion engine manufactures useful power from the explosive combustion of fuel, normally of the hydrocarbon type such as natural gas, gasoline, kerosene, diesel fuel, etc., and oxygen, normally taken from air. The internal combustion engine includes an air intake system which, in turn, includes a carburetor where the fuel and air are intimately mixed prior to combustion. In order to avoid mechanical problems in the carburetor and combustion chambers of the engine, both the fuel and air are normally filtered prior to entering the carburetor to remove dust particles and other contaminants. After a period of time in service, the contaminants collected by the carburetor air filter element begin to plug the pores of the filter element and can unduly restrict the flow of needed oxygen into the carburetor. With the air supply restricted by a partially plugged air filter element, the operating efficiency of the internal combustion engine is decreased. Therefore, it would be advantageous to provide a method for easily determining whether a carburetor air filter element in the air intake system of an internal combustion engine has become so restricted as to cause a decrease in the operating efficiency of the engine.

The maintenance procedures used for determining the need for replacing a carburetor air filter element are arbitrary and/or have little to do with the actual restriction of air flow caused by the filter element. Included among these procedures are the arbitrary replacement of the air filter element after a fixed period of time or, in the case of engines associated with transportation means, after a fixed number of miles traveled. Various procedures involve visually inspecting the used filter element to determine if it is "dirty." However, these visual techniques determine only surface dirtiness and are not primarily concerned with the real cause of air flow restriction, which is plugging of the pores of the air filter element. Also, these visual inspections are arbitrary in the sense that one must rely on the inspector's judgement as to what is an unacceptably dirty filter element. Up until now, there has been no satisfactory method for determining whether a carburetor air filter element is actually unduly restricting needed air flow or merely "looks" dirty.

Therefore, it is an object of the present invention to provide a method for determining whether a carburetor air filter element on an internal combustion engine unduly restricts the flow of needed combustion air to the engine. Other objects and advantages of the present invention will become apparent hereinafter.

It has now been discovered that by measuring the concentration of carbon monoxide in the exhaust gas of an internal combustion engine operated at no load conditions both with and without the carburetor air filter element in the air intake system of the engine, one can determine whether the air filter element is an undue restriction to the flow of combustion air. The fact that while practicing the present invention the engine is operated at no load conditions (the no load condition means that the engine is free-running, i.e., not working against a load whether real or simulated) provides important advantages. Testing for an unduly restrictive air filter element under no load conditions is inexpensive, uncomplicated and quick. Expensive load simulating equipment, e.g. chassis dynamometer, is not used. The skill and time required to set up and run loaded engine tests are not expended in the practice of the present invention. This, in turn, frees the mechanic for other, more difficult, engine maintenance problems.

In one aspect, the present invention is a method for determining whether a carburetor air filter element is an undue restriction to the flow of combustion air when the air filter element is used in the air intake system of an internal combustion engine to filter contaminants from the combustion air to the engine which comprises:

1. analyzing for the carbon monoxide concentration of the exhaust gases from the engine collected while the engine is being operated in modes (A) and (B), the two engine operational modes being at essentially constant no load conditions on the engine's main carburetion circuit at normal operating temperatures and (A) with and (B) without the carburetor air filter element in the engine air intake system, the engine being operated in modes (A) and (B) in any chronological sequence; and 2. comparing the carbon monoxide concentrations of the exhaust gases obtained in operational modes (A) and (B), whereby the air filter element is an undue restriction to the flow of combustion air if the carbon monoxide concentration of the exhaust gases obtained in operational mode (B) is substantially reduced from the carbon monoxide concentration of the exhaust gases obtained in operational mode (A).

In the above, the phrase "without the air filter element in the engine air intake system" means that the engine may be operated either with no air filter element, or with an air filter element that is known not to restrict the flow of combustion air.

To obtain meaningful and consistent results, it is necessary to operate the engine on its main carburetion circuit, rather than the idle circuit. Most commonly, this can be achieved by operating the engine at a speed of at least about 1,200 rpm. In order to insure that the engine is off the idle and on to the main carburetion circuit, it is more preferred that the engine speed be at least about 2,000 rpm. For safety reasons, the engine speed preferably should not exceed about 4,000 rpm., more preferably about 3,000 rpm., when practicing this invention. Therefore, the preferred range of engine speeds is from about 1,200 to about 4,000 rpm., more preferably from about 2,000 to about 3,000 rpm.

As stated previously, it has been discovered that a carburetor air filter element is unduly restricting the flow of combustion air if the carbon monoxide concentration of the exhaust gases obtained while operating the engine under no load conditions on its main carburetion circuit without the air filter element is substantially less than the exhaust gas carbon monoxide concentration obtained with the air filter element in the air intake system. A reduction in carbon monoxide concentration of at least about 0.5 percent by volume and preferably at least about 0.7 percent by volume (based on the total exhaust gas) is indicative of a restrictive air filter element. When the method of this invention provides this difference, the restrictive air filter element may be replaced or cleaned of contaminants in order to insure maximum engine operating efficiency.

The drawing included herein is a simplified block diagram of the method of the present invention.

Any carburetor air filter element which acts to remove contaminants from combustion air to internal combustion engines is capable of being tested by the method of the present invention.

The engine operated to test the air filter element may be the engine which is normally equipped with the air filter element or it may be any other internal combustion engine capable of employing this element to filter combustion air. However, in order to maximize testing convenience and speed, it is preferred that the test engine be the engine normally equipped with the air filter element being tested. Included among the internal combustion engines that may be used in the practice of this invention are those engines operated in association with transportation means, such as automobiles, trucks, etc. Internal combustion engines not associated with transportation means are also included. Engines which are used and/or designed for test purposes are also suitable. In fact, any internal combustion engine, including two cycle engines, four cycle engines, rotary piston driven engines and turbine engines, which uses an air filter element to remove contaminants from the incoming combustion air is useful in the practice of the present invention.

In the method of the present invention, the engine is run at normal operating temperatures to insure consistent results. In order to achieve normal operating temperatures, the engine may be run for a sufficiently long time so that the engine choke system, if any, is completely open and does not itself restrict the flow of combustion air. In any case, normal engine operating temperatures vary depending on the type of engine, air-fuel ratio, thermostatting, etc. Generally, normal operating temperatures for internal combustion engines are from about 170° to about 240° F. (engine block temperature).

The carbon monoxide content of the exhaust gases may be analyzed in any conventional manner known to the art. Included among these conventional analytical methods are: gas chromatography, mass spectrometry, and infra-red spectrometry. Because of the speed and accuracy of analysis, it is preferred to utilize infra-red spectrometry in the practice of the present invention. In particular, the use of non-dispersive infra-red (NDIR) analyzers is preferred in the practice of this invention. These infra-red analyzers operate on the known principle that carbon monoxide gas absorbs infra-red energy having a specific wave length. When infra-red energy is sent through a stream of engine exhaust gas, a certain amount of energy is absorbed by the carbon monoxide in the gas stream. The amount of absorbed energy has a direct relationship to the volume concentration of carbon monoxide in the exhaust gas. By comparing, normally using electronic means, the amount of infra-red energy of the wave length absorbed by carbon monoxide remaining with the original amount of infra-red energy of this wave length, it is possible to determine the amount of carbon monoxide in the exhaust gas. This type of infra-red analyzer can be packaged as a relatively portable instrument. This analyzer mobility is an additional reason for preferring infra-red spectrometry for analyzing the carbon monoxide concentration of engine exhaust gases.

When testing air filter elements that are associated with automobiles and other motor vehicles, the preferred way to collect an exhaust gas sample for analysis is to sample the tail pipe effluent, i.e., the exhaust system effluent. Since the engine exhaust system (i.e., muffler, tail pipe, etc,) is subject to great wear, the possibility of gas leaks exists. Therefore, in order to insure the accuracy of the tail pipe effluent carbon monoxide analysis, it is preferred that if the tail pipe effluent is used as the source for exhaust gas samples, the engine exhaust system be tested for gas leaks at some point during the practice of this invention. The point at which the leak testing takes place is not critical to the present invention, although, for convenience and time saving reasons, it is preferred that the leak testing occur at or prior to the time of the first carbon monoxide analysis.

The exhaust system leak testing can be accomplished in any conventional manner, for example, visual inspection of exhaust system. However, the preferred method of leak testing is to analyze the tail pipe effluent for oxygen concentration. It is well known that the exhaust gases from a conventional four cycle internal combustion engine (the standard automobile engine) contain between about 1 percent and about 4 percent by volume of oxygen. Any significant deviation, for example at least about 3 percent by volume, from the upper limit of the above oxygen concentration range found in the tail pipe effluent indicates a leak in the engine exhaust system. Exhaust from engines which are equipped with air injection emission control devices normally contain between about 7 percent and about 20 percent by volume of oxygen, and therefore may be deemed insensitive to the "oxygen analysis" method for testing for air leaks. The oxygen concentration can be obtained by any conventional analytical method, such as amperometric methods, magnetic susceptibility methods, gas chromatography and mass spectrometry. The preferred methods of oxygen analysis are the amperometric methods.

The following examples illustrate more clearly the method of the present invention. However, these illustrations are not to be interpreted as specific limitations on this invention.

EXAMPLE 1

A 1963 automobile powered by a standard four cycle internal combustion engine equipped with a carburetor air filter was selected for testing. In testing the carburetor air filter element, the engine was run at no load conditions and at normal operating temperatures so that the engine choke system did not restrict the flow of combustion air. It was determined that the engine exhaust system was in tack and that, therefore, reliable samples of exhaust gas could be obtained by sampling the tail pipe effluent. With the used air filter element in the air intake system, the engine speed was brought to and maintained at 2,500 rpm. (main carburetion circuit operation). This engine speed was maintained through the use of a portable tachometer. While maintaining the speed of the engine at 2,500 rpm., the exhaust gases (tail pipe effluent) from the engine were analyzed for carbon monoxide concentration by means of a portable non-dispersive infra-red analyzer. The carbon monoxide concentration was determined to be 4.0 percent by volume of the total exhaust gases.

The used air filter element was replaced by a new air filter element which was known not to unduly restrict combustion air flow. The speed of the engine was again brought to and maintained at 2,500 rpm. The exhaust gases were again analyzed and it was determined that the carbon monoxide concentration was 3.0 percent by volume of the total exhaust gases. This represented a substantial decrease (1 percent of the total exhaust gases) in carbon monoxide concentration relative to operating the engine with the used air filter. Therefore, the used air filter element was restricting the combustion air flow.

EXAMPLE 2 – 6

These examples illustrate the method of the present invention for testing several selected automobile engines. Each engine was a standard four cycle internal combustion engine. The testing procedure followed was similar to the one described in Example 1. The table below gives the results of these tests.

TABLE

| Example | Model year of auto | CO concentration in exhaust gas using— | | Decrease in CO concentration obtained using new filter, percent |
|---|---|---|---|---|
| | | Used filter, volume percent | New filter, volume percent | |
| 1 | 1,963 | 4.0 | 3.0 | 1.0 |
| 2 | 1,963 | 1.5 | 1.4 | 0.1 |
| 3 | *1,968 | 1.0 | 0.7 | 0.3 |
| 4 | *1,968 | 1.7 | 0.9 | 0.8 |
| 5 | *1,969 | 4.5 | 2.3 | 2.2 |
| 6 | *1,969 | 0.3 | 0.3 | 0.0 |

*Engine equipped with positive crankcase ventilation system to control harmful emissions.

The used air filter elements tested in Examples 1, 4 and 5 were unduly restricting the combustion air flow. Therefore, in order to maximize engine operating efficiency each of these used air filter elements were replaced or cleaned. The used filter elements tested in Examples 2 and 6 were not unduly restricting combustion air flow.

EXAMPLE 7 – 12

These examples illustrate the need to operate the engine on the main carburetion circuit when practicing the method of the present invention.

Examples 1 to 6 were repeated except that the exhaust gas which was analyzed was collected while the engine was being operated on the idle circuit rather than the main carburetion circuit, i.e., 2,500 rpm. The table below gives the results of these tests.

TABLE

| Example | Model year of auto | CO concentration in exhaust gas using— | | Decrease in CO concentration obtained using new filter, percent |
|---|---|---|---|---|
| | | Used filter, volume percent | New filter, volume percent | |
| 7 | 1,963 | 7.5+ | 7.0 | 0.5+ |
| 8 | 1,963 | 3.6 | 5.5 | −1.9 |
| 9 | 1,968 | 0.8 | 0.7 | 0.1 |
| 10 | 1,968 | 4.5 | 7.0 | −2.5 |
| 11 | 1,969 | 3.0 | 4.0 | −1.0 |
| 12 | 1,969 | 7.0 | 6.8 | 0.2 |

These results show that the engine exhaust gas carbon monoxide concentration at idle operation with and without the used air filter element in the air intake system are largely inconsistent and meaningless when trying to determine if the used element unduly restricts air flow.

As illustrated by Examples 3 to 6; the present invention is applicable to engines which are equipped with various emission control devices.

The testing sequence followed in Examples 1 through 6 is not critical to the practice of the present invention. For example, the engine could be operated and exhaust gases analyzed using a new filter element (or no filter element) prior to testing with the used element in place rather than vice versa.

As the procedure followed in the preceding examples illustrates, the present method is quick, uncomplicated and does not require a great deal of mechanical skill or experience to practice. The fact that during the practice of the invention, the engine is operated at no load conditions and portable infra-red analyzers can be used, makes this method extremely valuable for inexpensive testing large numbers of engine carburetor air filter elements. The portable infra-red analyzers and other equipment, such as oxygen analyzers which may be necessary, can be loaded onto a truck or van which is sent from place to place testing carburetor air filter elements. This mobility feature along with the combination of the other outstanding benefits of the present invention would not be possible without the discovery that meaningful results are obtained using no load engine conditions.

It should also be noted that the method of the present invention may result in replacement of restrictive carburetor air filter elements which not only will increase the operating efficiency of the internal combustion engine, but also may lead to significant reductions in the amount of deadly carbon monoxide emitted from automobiles and other systems utilizing the internal combustion engine.

Because of the concern over air pollution, this latter benefit of the present invention, i.e., the resulting reduction in carbon monoxide emitted, is increasingly important and, from the point of view of the public at large, may be the primary advantage of the present invention.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. A method for determining whether a carburetor air filter element is an undue restriction to the flow of combustion air to an internal combustion engine, said air filter element when in the air intake system of said engine being used to filter contaminants from said combustion air, which method comprises:
   1. placing said engine in operation under essentially constant no load conditions, at an essentially constant engine speed of at least about 1,200 rpm. on the main carburetion circuit of said engine and at normal operating temperatures of said engine;
   2. analyzing for the carbon monoxide concentration of the exhaust gases from said engine collected while said engine is being operated as in step 1 with said carburetor air filter element in said engine air intake system;
   3. removing said carburetor air filter element and analyzing for the carbon monoxide concentration of the exhaust gases from said engine collected while said engine is being operated as in step 1, steps 2 and 3 being performed in any chronological sequence;
   4. comparing the carbon monoxide concentrations obtained in steps 2 and 3, whereby said carburetor air filter element is an undue restriction to the flow of combustion air if the carbon monoxide concentration obtained in step 3 is reduced by at least about 0.5 percent by volume, based on the total exhaust gases, from the carbon monoxide concentration obtained in step 2; and
   5. replacing said carburetor air filter element with a non-restricting carburetor air filter element if said carburetor air filter element is an undue restriction to the flow of combustion air.

2. The method of claim 1 wherein said constant speed is within the range of about 1,200 to about 4,000 rpm.

3. The method of claim 1 wherein said constant engine speed is within the range of about 2,000 to about 3,000 rpm.

4. The method of claim 3 wherein said carburetor air filter element is an undue restriction to the flow of combustion air if the carbon monoxide concentration obtained in step 3 is reduced by at least about 0.7 percent by volume, based on the total exhaust gases, from the carbon monoxide concentration obtained in step 2.

5. The method of claim 4 wherein said exhaust gases are analyzed for carbon monoxide concentration by means of infra-red spectrometry.

6. The method of claim 5 wherein the exhaust system of said engine is tested for air leaks and said exhaust gases to be analyzed are collected from said exhaust system effluent.

7. The method of claim 1 wherein said exhaust gases are analyzed for carbon monoxide concentration by means of infra-red spectrometry.

8. The method of claim 7 wherein the exhaust system of said engine is tested for air leaks and said exhaust gases to be analyzed are collected from said exhaust system effluent.

* * * * *